US007609170B2

(12) United States Patent
Bickel et al.

(10) Patent No.: US 7,609,170 B2
(45) Date of Patent: Oct. 27, 2009

(54) INTERACTIVE INTERFACE WITHIN A MONITORING AND CONTROL DEVICE

(76) Inventors: Jon Andrew Bickel, 3123 Monarch Dr., Murfreesboro, TN (US) 37129; M. Jason Thurmond, 1306 River Rock Blvd., Murfreesboro, TN (US) 37128; Gregg G. Morasca, 608 Sunnybrook Dr., Brentwood, TN (US) 37027

(*) Notice: Subject to any disclaimer, the term of this patent is extended or adjusted under 35 U.S.C. 154(b) by 420 days.

(21) Appl. No.: 11/728,674

(22) Filed: Mar. 26, 2007

(65) Prior Publication Data
US 2008/0238701 A1 Oct. 2, 2008

(51) Int. Cl.
*G08B 23/00* (2006.01)
(52) U.S. Cl. .......................... 340/870.02; 340/870.01; 340/531; 340/539.1; 348/143; 348/160; 348/207
(58) Field of Classification Search ............ 340/870.02, 340/870.01, 531, 539.1; 348/143, 156, 160, 348/207; 379/37, 38
See application file for complete search history.

(56) References Cited

U.S. PATENT DOCUMENTS

| | | | | |
|---|---|---|---|---|
| 5,559,894 A * | 9/1996 | Lubliner et al. | ............. | 382/100 |
| 5,703,636 A | 12/1997 | Cifaldi | ............. | 348/14 |
| 5,826,008 A * | 10/1998 | Bluvband | ............. | 714/57 |
| 2002/0161536 A1 | 10/2002 | Suh et al. | ............. | 702/62 |
| 2005/0270173 A1* | 12/2005 | Boaz | ............. | 340/870.02 |
| 2009/0109056 A1* | 4/2009 | Tamarkin et al. | ............. | 340/870.02 |

FOREIGN PATENT DOCUMENTS

| | | |
|---|---|---|
| DE | 10034274 | 1/2002 |
| GB | 2380044 | 3/2003 |
| WO | WO 2004/097342 | 11/2004 |

OTHER PUBLICATIONS

Written Opinion corresponding to co-pending International Patent Application Serial No. PCT/US2008/003611, European Patent Office, dated Aug. 20, 2008, 7 pages.
International Search Report corresponding to co-pending International Patent Application Serial No. PCT/US2008/003611, European Patent Office, dated Aug. 20, 2008, 4 pages.
Klein, Matt, "Xilinx Video Over IP Solutions For Virtex-4 Devices," XILINX, www.xilinx.com, XAPP734 (v1.0) Dec. 7, 2006, 32 pages.
"OnStar," Wikipedia, the fee encyclopedia (Redirected from Onstar), http://en.wikipedia.org/wiki/Onstar, 4 pages, 1995.

* cited by examiner

*Primary Examiner*—Hung T. Nguyen

(57) ABSTRACT

A power monitoring device in a power utility system having an interactive display that allows an end user of the power monitoring device to communicate voice and optionally video data over the Internet protocol with a support operator at a remote system. The interactive display includes an input panel for accepting user inputs, and a video display for displaying power-related data monitored by the power monitoring device. The power-related data is communicated over a communications medium, such as Ethernet, to the remote system for diagnostics, troubleshooting, setup and configuration, and the like. The input panel features one-touch voice and optionally video communication with a support operator by an end user standing in front of the interactive display. The remote system can also download firmware or software upgrades to the power monitoring device via the communications medium according to the Internet protocol.

24 Claims, 4 Drawing Sheets

INTERACTIVE INTERFACE WITHIN A MONITORING AND CONTROL DEVICE

FIELD OF THE INVENTION

The present invention relates generally to utility monitoring systems and devices, and, more particularly, to a monitoring device that facilitates audio and video communication among user access points.

BACKGROUND OF THE INVENTION

Since the introduction of electrical power distribution systems in the late 19th century, there has been a need to monitor their operational and electrical characteristics. The ability to collect, analyze, and respond to information about the electrical power system can improve safety, minimize equipment loss, and ultimately save time and money. To that end, monitoring devices were developed to measure and report such information.

Historically, a lot of time and effort go into configuring newly installed monitoring devices. Generally during the startup of a monitoring system, the monitoring devices are configured while the system is in an atypical mode of operation. It then may be necessary for end-users to reconfigure their system some days or even months after it was installed. Diagnosing device problems can be complex, often resulting in unnecessary warranty work. This warranty work generally entails additional costs to the manufacturer and end-user. Additionally, users can become frustrated when trying to determine the appropriate manufacturing representatives to assist them with their monitoring device issues. These issues result in time and monetary costs for both the customers and manufacturers. Manufacturers also often lose potential sales due to the fact that end-users cannot contact them, or lack problem resolution due to the confusion surrounding remote interfacing.

Moreover, in power monitoring systems, operators at metering points are in very close proximity to electrical conductors carrying enough current to cause serious harm or even death. Arc flash explosions are a particular concern, and operators can be trepid about contacting or standing near equipment, including power monitoring devices, that is coupled to high-power conductors.

There is a need for a power monitoring device allowing communication between the end-user and the manufacturer that can save time, money, and aggravation on both sides. There is also another need for enhanced communications for voice, video, and data. Further, there is a need for a system that minimizes physical operator interaction with a power monitoring device. Additionally, there is a need for a system to provide improved sales and services, such as remote diagnostics of system or device data by service organizations, as well as additional opportunities for device sales in the power context.

SUMMARY OF THE INVENTION

According to an aspect of the present invention, a monitoring device, such as a power monitoring device, in communication with a remote system includes an interactive display, a controller, and an interface. The interactive display includes a microphone, an input panel having at least one input device for receiving an input from a user of the monitoring device, a speaker, and a video display for displaying data indicative of at least one characteristic monitored by the monitoring device. The controller is programmed to convert sound signals received by the microphone to audio data. The controller also converts the audio data according to a communications protocol (which, optionally, is the Internet Protocol) to produce voice data. The interface is coupled to the controller, receives the voice data and communicates the voice data over a communications medium, such as Ethernet, to the remote system. The remote system may be a power monitoring system. The at least one characteristic may include at least one of voltage, current, power, energy, relative phase, or harmonic distortion.

According to other aspects, the monitoring device may further include an imaging device, such as a video camera, that receives video images and converts the video images to image data. The controller may be further programmed to map the image data into the communications protocol to produce video data. The controller may further be programmed to cause a characteristic different from the at least one characteristic to be displayed on the video display in response to actuation of the at least one input device. The controller may be further programmed to cause a communications link to be established between the monitoring device and the remote system in response to actuation of the at least one input device. The controller may be further programmed to cause a communications link to be established between the monitoring device and a second monitoring device communicatively coupled to the monitoring device via a serial communications link, the communications link communicating voice data between the monitoring device and the second monitoring device. The second monitoring device may be in daisy-chain communication with a third monitoring device.

The controller may be further programmed to cause a communications link to be established between the monitoring device and a second monitoring device communicatively coupled to the monitoring device via a serial communications link. The communications link communicates voice data between the monitoring device and the second monitoring device. According to various aspects, the controller and the interface may be housed within a housing. The interactive display may be physically separate from the housing and communicatively coupled to the controller via a wired or wireless link. The controller may be further programmed to convert, according to a communications protocol, incoming voice data received at the interface to corresponding incoming audio data and providing the incoming audio data to the speaker for conversion to acoustical sound. The controller may be further programmed to map, according to a communications protocol, incoming video data received at the interface into corresponding incoming image data and causing the image data to be displayed on the video display.

According to another aspect of the present invention, a utility monitoring system includes a utility monitoring device, an interactive display unit, a communications interface, and an Internet Protocol (IP) controller. The utility monitoring device includes a sensor for sensing at least one characteristic related to a utility being monitored by the utility monitoring system. The interactive display unit is communicatively coupled to the utility monitoring device, and includes a microphone, a speaker, a video display, and a plurality of input devices, each coupled to a controller. The communications interface is programmed to communicate data over a communications medium according to a communications protocol between a remote system and the power monitoring device or the interactive display unit. The IP controller converts between audio data received by the microphone to voice data representative of the audio data. The IP controller is coupled to the controller, and is programmed to communicate the voice data relative to the communications interface over the communications medium according to the communications protocol.

The interactive display unit may include an imaging device, such as a video camera, coupled to the controller. The IP controller may be programmed to convert image data received from the imaging device to video data representing the image data. The IP controller may be further programmed to communicate the video data relative to the communications interface over the communications medium.

In some aspects, the interactive display unit may include the communications interface. In other aspects, the interactive display unit may include the IP controller.

The controller may be programmed to initiate a voice-enabled communication link over the communications medium between the utility monitoring device and the remote system or a second utility monitoring device in response to the actuation of at least one of the plurality of input devices. The controller is further programmed to communicate characteristic data representing the at least one characteristic between the utility monitoring device and the remote system or the second utility monitoring device. The utility monitoring device may include a memory storing configuration data indicative of configuration parameters of the utility monitoring device. The controller may be programmed to communicate at least a portion of the configuration data between the utility monitoring device and the remote system or a second utility monitoring device.

The utility monitoring device may include a memory storing firmware. The controller may be programmed to receive an instruction from the remote system over the communications medium, the instruction causing the remote system to download to the utility monitoring device a second firmware that the controller replaces with the firmware stored in the memory.

In some aspects, the utility monitoring device may include the interactive display unit. In some aspects, the interactive display unit may be wirelessly coupled to the utility monitoring device.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
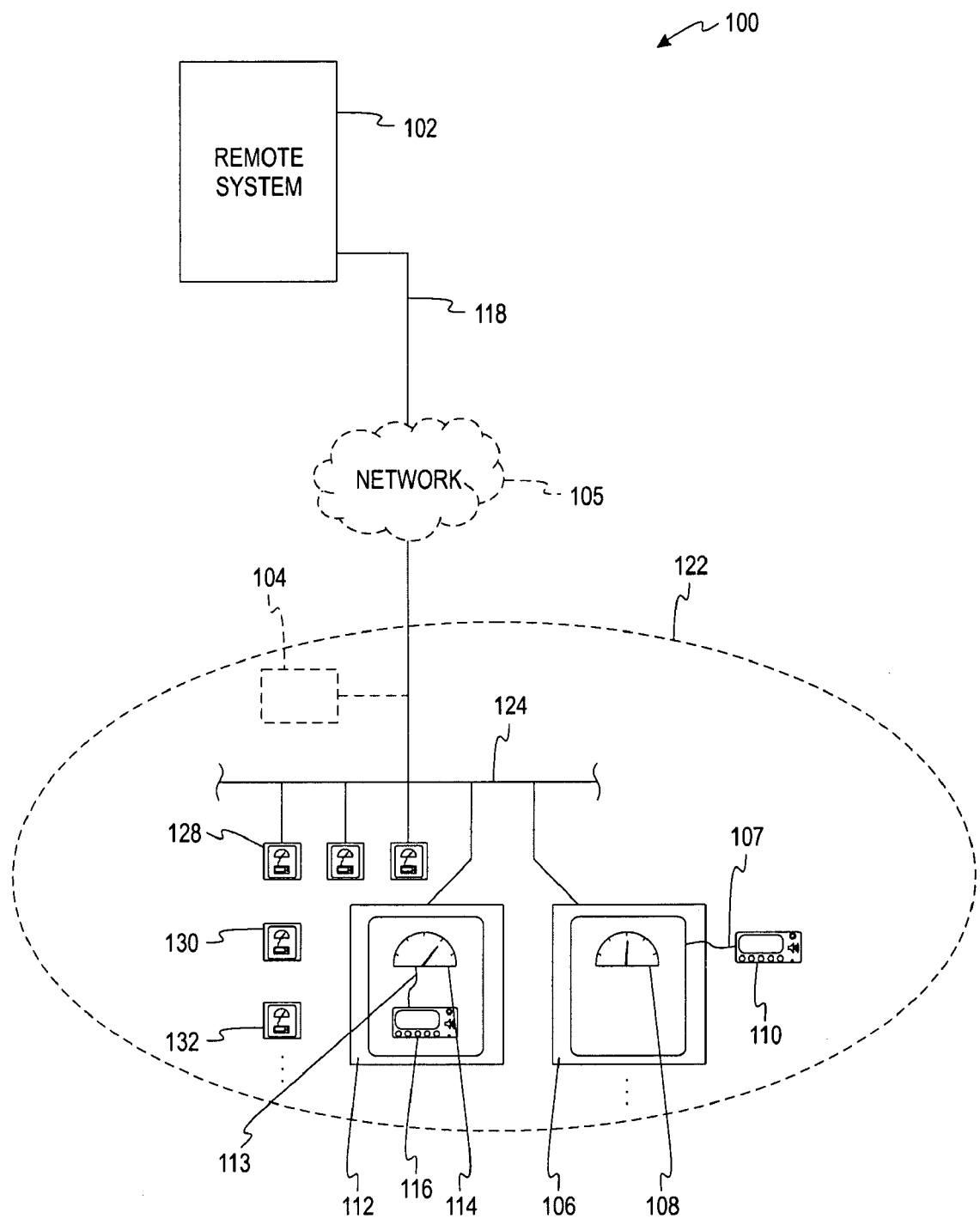
FIG. 1 is a block diagram of a power monitoring system according to an aspect of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Turning now to FIG. 1, a block diagram of a power monitoring system 100 is generally shown. The power monitoring system 100 generally includes a remote system 102 that is accessible by at least one support personnel and a facility 122. The remote system 102 may include a server or a computer with an appropriate user interface (e.g., a video display and input device(s), such as a touch screen and/or a mouse, a keyboard, and the like), which can receive characteristic or parameter data communicated from an electrical meter, along with other data, such as audio and/or video data, as described below. Alternately, the remote system 102 may not receive power-related data from the facility 122, but can receive audio or video data as described below.

Although aspects herein are described with reference to a power monitoring system 100, it is understood that the power monitoring system 100 may be any utility monitoring system, where the utility being monitored can be any of the five utilities designated by the acronym, WAGES, or water, air, gas, electricity, or steam. Each monitoring device measures characteristics of the utility, and quantifies these characteristics into data that can be analyzed (and/or stored, logged, alarmed upon, used for control purposes, and the like) by a computer. A power monitoring and control device, for example, measures electrical characteristics and quantifies these characteristics into data (e.g., representing voltage, current, power, and the like). The power monitoring system is merely exemplary and does not represent the only utility contemplated by aspects of the present invention.

The remote system 102 is coupled to an optional communications network 105 via a communications link 118. It should be noted that the optional communications network 105 is not necessarily a part of the power monitoring system 100, but may be accessible by the power monitoring system 100. The communications link 118 includes a serial connection or bus, such as RS-232, RS-485, or Universal Serial Bus (USB) connection. Alternatively, the communications link 118 may include an Inter-Integrated Circuit bus ($I^2C$) or other suitable connection, such as an Internet Protocol (IP) connection (e.g., Ethernet). The optional communications network 105 may be a private or public LAN or WAN, preferably the Internet, or may be a telephone system, such as PSTN (public switched telephone network). In implementations that do not include the communications network 105, the remote system 102 may communicate directly with a power monitoring and control device in the facility 122 via a modem. In this aspect, the power monitoring and control device may not have the ability to communicate video data relative to the remote system 102.

The remote system 102 is communicatively coupled to a facility 122, which includes a first power monitoring and control device 106 and a second power monitoring and control device 112. More generally, the devices 106, 112 may be utility monitoring devices (where the utility is one of WAGES). The first power monitoring and control device 106 is coupled to the second power monitoring and control device 112 via a communications link 124, which, like the communications link 118, can be a conventional serial link, such as RS-232, RS-485, $I^2C$ bus, or USB link. Alternatively, the communications link 124 may have a wider bandwidth link, such as an Ethernet link. Other power monitoring and control devices are shown in the facility 122, each coupled to one another via the communications link 124. Power monitoring and control devices 130, 132 are shown in daisy-chain communication with a power monitoring and control device 128. In this configuration, for example, data from the monitoring device 132 passes by monitoring device 130, and is received by the monitoring device 128, which puts the data onto the communications link 124.

The first power monitoring and control device 106 and the second power monitoring and control device 112 includes electrical (or utility) meters 108 and 114, and interactive displays 110 and 116. As used herein, a meter refers to any system element or apparatus with the ability to sample, collect, or measure one or more operational characteristics or parameters of a utility (WAGES) system. In this example, the electrical meters 108 and 114 can be based on a PowerLogic® Series 3000/4000 Circuit Monitor or a PowerLogic® ION7550/7650 Power and Energy Meter available from Schneider Electric, or any other suitable monitoring device such as a circuit breaker, a metering device, or a power meter. The operational characteristics can include voltage, current, power, energy, relative phase, harmonic distortion, and other power-related characteristics. Alternately, the operational characteristics can include characteristics related to water, air, gas, or steam utilities, such as pressure and flow rate. The electrical meters 108 and 114 are adapted to send, inter alia, power-related data sampled, collected, or measured to the interactive displays 110 and 116 via respective communications links 107 and 113. The meters 108, 114 can also send device configuration data, historical data stored on the meter 108, 114, and the like. The communications links 107 and 113 may include a serial connection, such as an RS-232, RS-485, or USB connection. Alternatively, the communications links 107 and 113 may comprise an I$^2$C bus. In another implementation, the communications links 107 and 113 include wireless connections, such as IEEE 802.15.1 (Bluetooth), IEEE 802.11xx (WiFi) connections or IEEE 802.15.4 (ZigBee). In another embodiment, the electrical meters 108 and 114 are adapted to send the sampled, collected, or measured power-related data across the communication link 118 via the optional communications network 105 to the remote system 102. Alternatively, the electrical meter 108 and 114 can be connected to the remote system 102 without the optional communications network 105. According to any of these implementations, a support operator accessing the remote system 102 can access the same power-related data sent from the electrical meters 108 and 114 to the interactive displays 110 and 116. A support operator accessing the remote system 102 can therefore better diagnose any issues encountered by an end user accessing the interactive displays 110 and 116. Information about the end-user's devices and system may also be reviewed by support personnel at the remote system 102. Diagnostic dashboards displayed on a video display associated with the remote system 102 can be used by the support operator to quickly evaluate system or device configurations, diagnostic registers, operational parameters, etc. associated with the electrical meters 108, 114 to more effectively and efficiently assist the end-user. It is also contemplated that the interactive displays 110 and 116 can serve as portals to other monitoring devices in the system 100 so that their characteristics and parameters may also be evaluated and diagnosed remotely.

In an example, the electrical meter 108 and the interactive display 110 are not housed within a single power monitoring and control device 106, but physically separated by a distance. The separation allows physical isolation for the end user from the electrical meter 108. This provides safety benefits, as the end user is less likely to be subjected to arc flashes and other dangerous arcing phenomena, which can result in severe injury. The separation also keeps higher voltages going into the meter's terminals away from the switchgear door where the interactive displays may be mounted. The communications link 107 may be wired or wireless, the latter implementation providing additional protection and isolation between the end user and the electrical meter 108.

The interactive displays 110 and 116 are adapted to display power-related characteristics and parameter data, configuration data, historical data, alarm data, register data, and other data received from the respective electrical meters 108 and 114. Further, the interactive displays 110 and 116 are adapted to receive an acoustical sound input from the user. In another embodiment, the interactive displays 110 and 116 are adapted to receive image input from the end user via a video camera. These aspects are described in more detail in connection with FIG. 2a-b below.

The first and second power monitoring and control devices 106 and 112 are adapted to communicate voice-over-Internet-protocol ("VoIP") data to and from an optional adapter 104. As used herein, the term "VoIP" includes voice-over DSL or "VoDSL." In another implementation, the first and second power monitoring and control devices 106 and 112 are adapted to communicate video data over the Internet protocol to the adapter 104. This information can be sent over a phone connection with the use of a modem, Ethernet, or utilizing wireless technologies such as WiFi, Bluetooth or ZigBee.

The optional adapter 104 may include a server, computer, router, or similar device capable of handling data transactions that are IP-capable, such as voice data and power-related data. In implementations where the adapter 104 is a computer, such as a personal computer, the adapter 104 may manage the power monitoring system in the facility 122. In another implementation, the adapter 104 is further capable of handling video data transactions. The adapter 104 is connected to the plurality of power monitoring and control devices 122, and may exist within the facility 122 or outside the facility 122. The adapter 104 manages voice and data transactions sent to and from the plurality of power monitoring and control devices 122 and the remote system 102. The adapter 104 also routes voice and data transactions among the power monitoring and control devices 122 and the remote system 102. In an implementation, end users accessing the first power monitoring and control device 106 can mutually interact and share data via adapter 104 and its routing circuits with end users accessing the second power monitoring and control device 112.

Figure 2A:
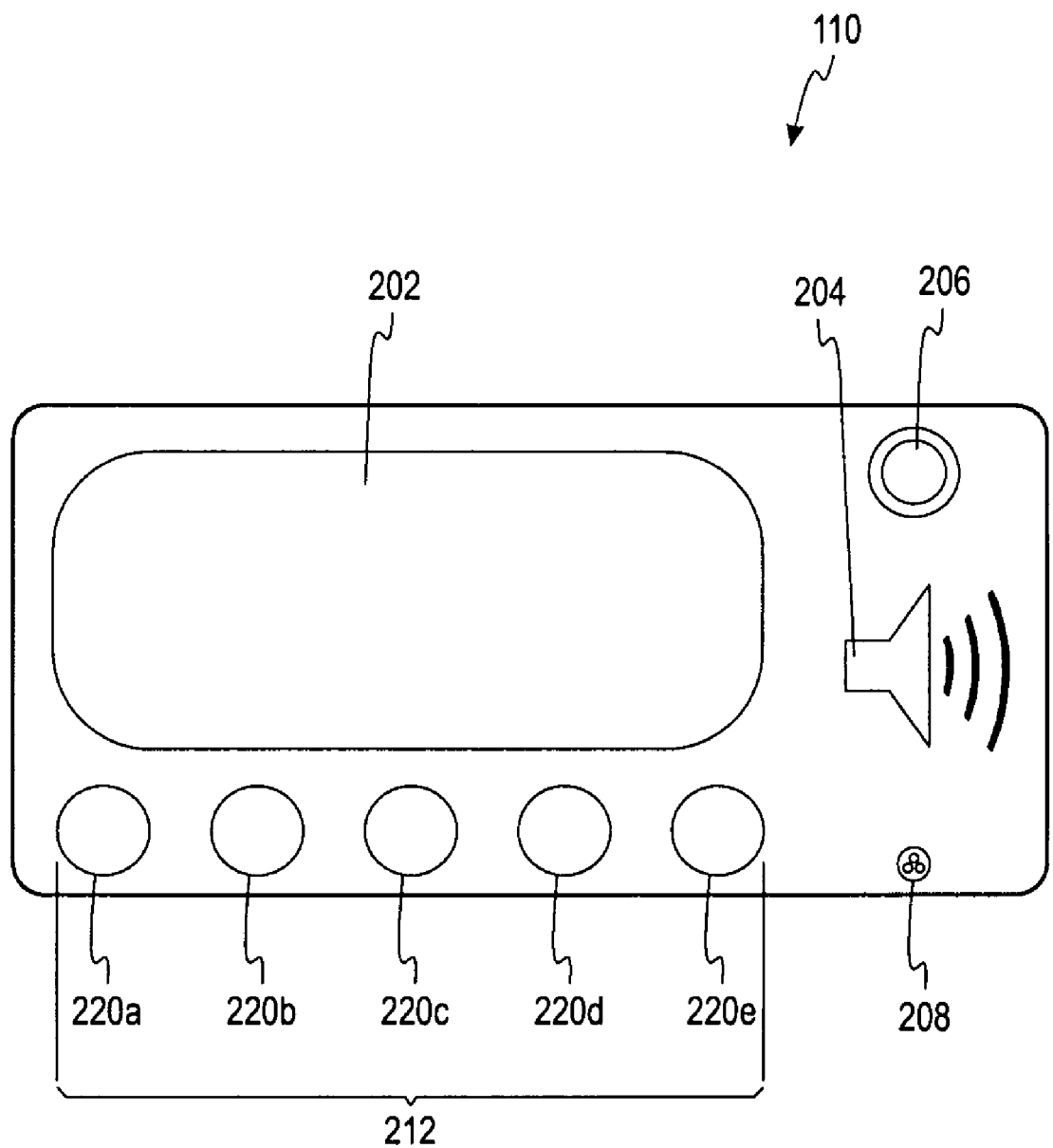
FIG. 2*a* is a functional diagram of a power monitoring and control device according to an aspect of the present invention.
Figure 2B:
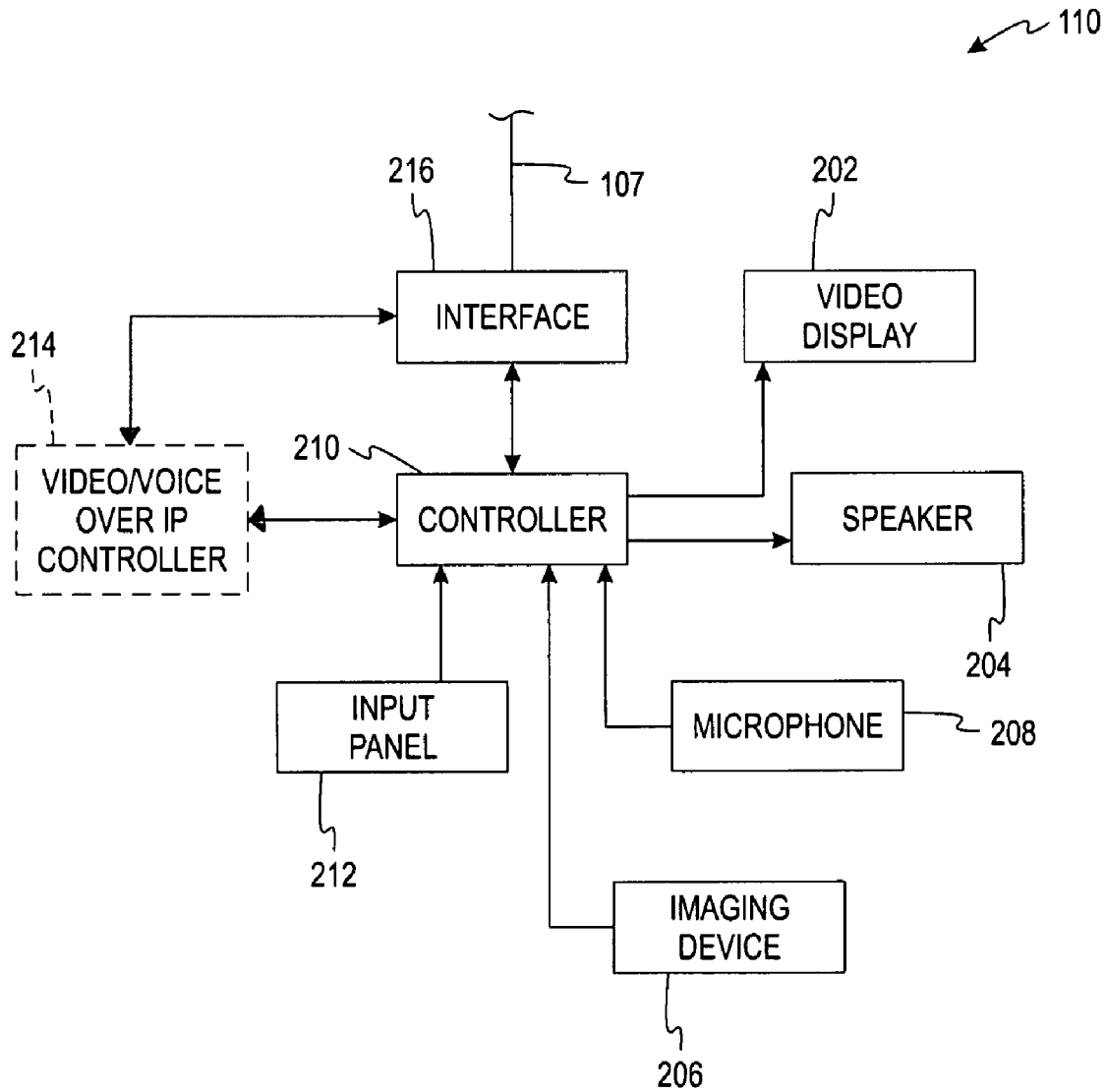
FIG. 2*b* is a functional block diagram of functional components of a power monitoring and control device according to a specific aspect of the present invention.

FIG. 2a is a functional diagram of an interactive display such as the first interactive display 110 in FIG. 1. FIG. 2b is a functional block diagram of components of the interactive display 110. The first interactive display 110 may include a video display 202, a speaker 204, an imaging device 206, such as a video camera, a microphone 208, a controller 110, an input panel 212, an optional video/voice over IP controller 214, and a communications interface 216.

The video display 202 may be a vacuum florescent display (VFD), liquid crystal display (LCD), organic light-emitting diode display (OLED), plasma display, field emission display, digital micromirror display (DMD), light-emitting diode (LED) display, or other video display type. The video display 202 displays monitored data and other data received from the electrical meter 108. The data may include peak voltage, root means squared (RMS) voltage, RMS current, relative phase, impedance, or other power-related characteristics or parameters, configuration data, calibration data, historical data, register data, alarm data, and the like.

The imaging device 206 is preferably a digital video camera and receives images via its sensor and converts those images to image data according to a frame rate, such as 24 or 30 frames per second. In an implementation, the imaging device 206 is fixed within the interactive display 110. In other implementations, the imaging device 206 is removable from the interactive display, allowing the end user to point the imaging device at a particular component in the switchgear panel, for example. In this implementation, the remote operator at the remote system 102 can troubleshoot remotely issues in the facility 122 without having to send service or support personnel to the facility 122.

The first interactive display 110 further includes an optional video/voice over IP controller 214, which processes video and voice or voice only data over a communications medium. As explained above, the adapter 104 may alternately include a video/VoIP controller 214 and routes the video or voice data packets to the appropriate destinations. In that implementation, the interactive display 110 does not include such a controller. In still another implementation, the electrical meter 108 includes the video/VoIP controller 214. Thus, aspects of the present invention contemplate that the video/voice over IP controller 214 may be in each interactive display 110, 116, in the electrical meter 108, or may be part of the adapter 104, which also has routing capability, or in any combination of the foregoing. The communications medium (e.g., Ethernet) for the video/audio data may be terminated in the first interactive display 110 at the interface 216, in the electrical meter 108, or in both.

The interface 216 may also be configured to interface with a laptop, personal data assistant (PDA), cellular device, and the like having audio and video capabilities. Audio data, video data, or both can be stored on these devices for archiving or training purposes. In this example, the interface 216 may be a wired or wireless interface. In this example, the interactive display 110 would not necessarily need the video display 202, the microphone 208, the speaker 204, or the imaging device 206, as these components are present in the laptop, PDA, or cellular device communicatively coupled to the interactive display 110.

In implementations in which the controller 214 supports only VoIP transactions, the controller may include a SigC55xx DSP Module available from Signalogic, Inc. In VoIP-only implementations, the controller 214 may be part of an Analog Telephone Adapter (ATA), IP Phone, or device programmed to process VoIP data transactions. Note that as used herein, VoIP includes VoDSL, which utilizes the existing PSTN system as its communications medium.

Returning to FIG. 2b, the controller 210 is connected to the speaker 204, which outputs audio data to the user. The controller 210 is also connected to a microphone 208, which receives an acoustical sound input from the end user. Alternately, the microphone 208 and the speaker 204 may be part of a conventional telephony device. However, conventional telephony devices utilize circuit switching, which maintains an active connection throughout a call. Because much of a call is dead air, circuit switching results in wasted bandwidth. VoIP, on the other hand, sends data over an Internet Protocol, utilizes packet switching, which sends and retrieves data as the user needs it.

According to a preferred aspect, the first interactive display 110 includes a video-over-IP (Internet protocol) controller 214. As used herein, "video-over-IP" includes both video and voice over IP or DSL. Video-over-IP utilizes a video codec, onboard the controller 214 in this example, to reduce captured video to a bitstream and transports the bitstream over an Internet Protocol via a communications link 107 such as Ethernet. Video codecs, such as MPEG layer 4, compress video data to manageable sizes. An example of a suitable Video-over-IP controller 214 is a "Video over IP platform for Virtex™-4 Devices" available from Xilinx, Inc. The video-over-IP controller 214 is coupled to the imaging device 206 via the controller 210 or optionally connected directly. The video-over-IP controller 214 maps data (such as imaging data or audio data) into the Internet Protocol so that it can be transported over a TCP/IP-enabled communications medium. Although FIG. 2b shows the I/O devices (e.g., the speaker 204, the microphone 208, the imaging device 206, and the video display 202) connected to the controller 210, in an implementation having the video-over-IP controller 214, any or all of the I/O devices (e.g., the speaker 204, the microphone 208, the imaging device 206, and the video display 202) may be connected to the video-over-IP controller 214 instead.

As described above, the first interactive display 110 may be coupled to an adapter 104 shown in FIG. 1. In an aspect, the adapter 104 handles VoIP data communicated to and from the power monitoring and control device 106. In another aspect, the optional adapter 104 further routes video/voice-over-IP data sent from the power monitoring and control device 106. From the optional adapter 104, VoIP data and/or Video Over IP data is communicated to the remote system 102, which further processes and converts the video and/or voice data into graphical images that are displayed to the operator and/or audio data that is broadcast to the operator.

The input panel 212 of the first interactive display 110 accepts user inputs. In an example, the input panel 212 includes buttons 220a, 220b, 220c, 220d, and 220e which the user can press in order to alter data shown on the electronic screen 202 and/or call up particular support personnel accessing the remote system 102. For instance, in this example, the button 220a selects a particular power-related characteristic that is being monitored by the electrical meter 108 to be displayed on the video display 204. Alternately, inputs to the first interactive display 110 may be received from a laptop, PDA, cellular device, or other device as indicated above.

In this example, pressing the button 220b initiates communication with technical assistance, which connects the power monitoring and control device 106 to technical assistance personnel accessing the remote system 102. Furthermore, because the remote system 102 is in communication with the electrical meter 108, technical assistance personnel accessing the remote system 102 will have access to information about the circuits connected to the electrical meter, such as electrical meter 108 in FIG. 1. This information will allow technical assistance personnel to quickly evaluate system or device configurations, diagnostic registers, operational parameters, and other system items to more effectively and efficiently assist the end-user.

In another example, pressing the button 220c initiates communication with particular sales personnel who are accessible via the remote system 102. Video and audio or audio only communication with the sales personnel are carried out via the interactive display, such as the first interactive display 110.

In another example, the button 220d initiates communication with a particular power monitoring and control device, such as the second power monitoring and control device 112. In this example, end users may interact with multiple interactive displays to communicate with each other at different locations. Once the end user has selected the appropriate personnel, the end user can utilize the VoIP and/or Video Over IP communications mediums to communicate with the selected personnel. In another example, the button 220e acts as an emergency or "SOS" button, which sends an emergency signal to the remote system 102 or some other monitoring system to render aid or assistance. Of course other controls and input devices may be included on the input panel 212 such as selection of power-related data to be displayed on the electronic screen 202, or to display user access points (such as the remote system 102) currently connected to the power monitoring and control device 106.

In another example, the input panel 212 includes buttons 220a, 220b, 220c, 220d, and 220e that, when pressed, invoke menu commands so that the user can navigate to specific functions, such as calling up specific personnel or displaying specific data.

In still another example, security measures are incorporated into the interactive display 110 that eliminate nuisance, unauthorized, or inadvertently placed calls from end-user facilities. For example, the SOS button 220e may need to be pressed for a number of seconds prior to communication being established with the remote system 102. Alternately or additionally, an end user attempting to change configurations or settings on the meter 108 may require the approval of the operator at the remote system 102 and/or an operator at the computer 104.

Figure 3:
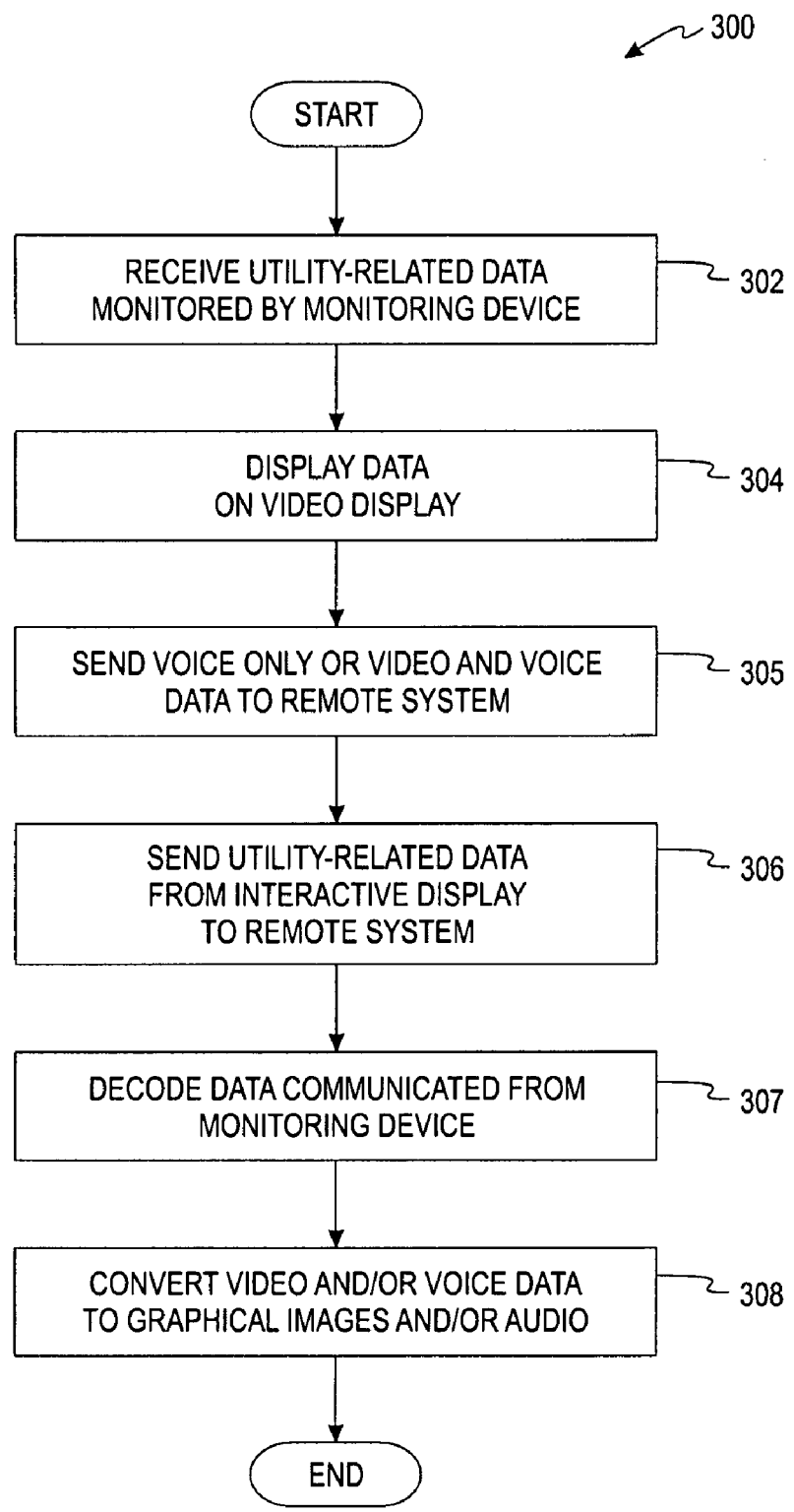
FIG. 3 is a flow chart of a method for displaying data and communicating over a network within a power utility system according to an aspect of the present invention.

FIG. 3 is a flowchart 300 for communicating VoIP only or voice and video data over IP between the remote system 102 and any of the power monitoring and control devices in the system 100. Aspects of the flowchart 300 are carried out by machine readable instructions. In this example, the machine readable instructions comprise an algorithm for execution by: (a) a processor, (b) a controller, and/or (c) any other suitable processing device, such as the controller 210, 214, the adapter 104, or the remote system 102. The algorithm may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it maybe implemented by an application specific integrated circuit (ASIC), a programmable logic device (PLD), a field programmable logic device (FPLD), discrete logic, etc.). Also, some or all of the machine readable instructions represented by the flowchart of FIG. 3 may be implemented manually. Further, although the example algorithm is described with reference to the flowchart illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The electrical meter 108 communicates power-related data being monitored by the electrical meter 108, which is received (302) by the power monitoring and control device 106. The power-related data is displayed (304) on the video display 202 of the interactive display 108. Voice communications or voice and video communications from an end user are communicated (305) from the power monitoring and control device 106, responsive to inputs received by the microphone 208 or the imaging device 206, to the remote system 102, optionally via the adapter 104. In this example, they are sent over a VoIP-enabled or video-over-IP-enabled communications medium. Because voice/video-over-IP data includes digital data, the remote system 102 or the adapter 104 decodes the voice communications data received (307). The data is converted to an analog sound signal that corresponds to the original voice input given by the user accessing the power and monitoring and control device 106 (308). When the data includes video data, the video data is also converted to a sequence of graphical images that correspond to the video input received by the imaging device 206 (308). Circuit data is also sent (308) from the power monitoring and control device 106 to the remote system 102.

Some additional benefits of the system 100 and method 300 described above include: convenience for customers to interact with the manufacturer, offering a more convenient method for customers to interact with other metering sites; a more efficient use of the interaction time, faster response time by the meter manufacturer; a better understanding of customer needs; reduced warranty work; improved device and system health; and improved customer perception of the product. Examples include site-to-site communications (meter to meter), one-touch technical support, one-touch sales, one-touch services, safety or emergency response (e.g., in the event of a critical failure or bodily injury), and feedback.

In implementations where the interactive display 110 includes the imaging device 206, such as a digital video camera, remote operators at the remote system 102 can use the imaging device 206 to determine whether an end user is positioned near the power monitoring and control device 106 in the facility 122. The remote operator at the remote system 102 can verify that an end user is not present in front of the device 106 prior to remotely operating a control function on a circuit breaker in the switchgear panel, for example. The imaging device 206 can also be used to provide training to end users. For example, the manufacturer of the power monitoring and control device 106 can conduct meter operation training remotely and simultaneously with as many end users as there are meters to view the instructional material on their respective interactive displays.

Numerous safety aspects are also enhanced by aspects of the invention described herein. The imaging device 206 allows for remote monitoring and control of power monitoring equipment, removing the user from the switchgear environment, where dangerous levels of current are present and eliminating the risk of bodily harm caused by arc flash explosions and the like. By separating the interactive display from the meter, the present invention reduces the risk that an end user of the power monitoring equipment will be subjected to an electrical hazard.

The end user will also have access to sales and services information, including remote diagnostics of system or device data by service organizations. Additionally, there will be additional opportunities for device sales.

An interactive display can allow end-users to contact directly the appropriate product personnel to help address their immediate issues while they are standing in front of the panel of a power monitoring device in the field. The interactive display according to aspects of the present invention is capable of emulating a telephone where modem connections are used (PSTN or cellular technology). With the simple push of a button (in an implementation), end-users are able to communicate with the "right" manufacturing personnel including: technical support, services, sales, etc. Aspects of the present invention eliminate the need for the end users to keep track of contact names and phone numbers, and brings customer service into the switchgear room with the end-user via the interactive display. No longer does the end user have to leave the switchgear room, and the equipment on which troubleshooting, diagnostics, or other servicing needs to be carried out, in order to communicate with the manufacturer or service or sales personnel.

The interactive display can also provide voice/video over IP, visual and data interactions with the end-user with a faster communications pipe (e.g., Ethernet, etc.). Of course, when only VoIP data is communicated, a narrower pipe may suffice (e.g., a serial connection via a modem). This wider pipe allows many additional features beyond the standard modem interaction. Support personnel can interact with the monitoring device or even other monitoring devices in the monitoring system via the single interactive display.

Additional innovative features that are contemplated by the interactive display for both the end-user and the manufacturer include improved diagnostic capabilities with respect to troubleshooting (e.g., characteristic or parameter data associated with the power monitoring and control device 106 can be communicated to the remote system 102 via the communications link 118, allowing an operator at the remote system 102 to troubleshoot a problem based upon the characteristic or parameter data), setup and configuration (e.g., the remote system 102 can display setup and configuration information associated with the power monitoring and control device 106), firmware and software upgrades (e.g., the remote system 102 can download firmware or software upgrades to the power monitoring and control device 106 over the communications link 118), and diagnostic dashboards (e.g., displayed at the remote system 102) that quickly allow the technical support representative to evaluate and remedy the end-user's problem. Additionally, end users will have access to marketing and product information pertaining to how products are being used, in both applications and environments.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An utility monitoring device in communication with a remote system, comprising: an interactive display that includes a microphone, an input panel having at least one input device for receiving an input from a user of the utility monitoring device, a speaker, and a video display for displaying data indicative of at least one characteristic monitored by the utility monitoring device;
   a controller programmed to convert sound signals received by the microphone to audio data, the controller converting the audio data according to a communications protocol to produce voice data;
   an Internet (IP) protocol controller coupled to the controller, the IP controller being programmed to communicate the voice data representative of the audio data via a communications interface over a communications medium according to the communications protocol; and
   the communications interface coupled to the controller, the communications interface receiving the voice data and communicating the voice data over the communications medium to the remote system.

2. The utility monitoring device of claim 1, further comprising an imaging device that receives video images and converts the video images to image data, the controller being further programmed to map the image data into the communications protocol to produce video data.

3. The utility monitoring device of claim 1, wherein the controller is further programmed to cause a characteristic different from the at least one characteristic to be displayed on the video display in response to actuation of the at least one input device.

4. The utility monitoring device of claim 1, wherein the controller is further programmed to cause a communications link to be established between the monitoring device and the remote system in response to actuation of the at least one input device.

5. The utility monitoring device of claim 1, wherein the controller is further programmed to cause a communications link to be established between the utility monitoring device and a second utility monitoring device communicatively coupled to the utility monitoring device via a serial communications link, the communications link communicating voice data between the utility monitoring device and the second utility monitoring device.

6. The monitoring device of claim of claim 5, wherein the second utility monitoring device is in daisy-chain communication with a third utility monitoring device.

7. The utility monitoring device of claim 1, wherein the communications protocol is the Internet Protocol.

8. The utility monitoring device of claim 2, wherein the communications protocol is the Internet Protocol.

9. The utility monitoring device of claim 1, wherein the at least one characteristic includes at least one of voltage, current, power, energy, relative phase, or harmonic distortion, and wherein the utility monitoring device is a power monitoring device, and wherein the remote system is a power monitoring system.

10. The utility monitoring device of claim 2, wherein the controller is further programmed to cause a communications link to be established between the utility monitoring device and a second utility monitoring device communicatively coupled to the utility monitoring device via a serial communications link, the communications link communicating voice data between the utility monitoring device and the second utility monitoring device.

11. The utility monitoring device of claim 2, wherein the imaging device is a video camera.

12. The utility monitoring device of claim 1, wherein the communications medium is Ethernet.

13. The utility monitoring device of claim 1, wherein the controller and the interface are housed within a housing, the interactive display being physically separate from the housing and communicatively coupled to the controller via a wired or wireless link.

14. The utility monitoring device of claim 1, wherein the controller is further programmed to convert, according to a communications protocol, incoming voice data received at the interface to corresponding incoming audio data and providing the incoming audio data to the speaker for conversion to acoustical sound.

15. The utility monitoring device of claim 14, wherein the controller is further programmed to map, according to a communications protocol, incoming video data received at the interface into corresponding incoming image data and causing the image data to be displayed on the video display.

16. An utility monitoring system, comprising: an utility monitoring device having a sensor for sensing at least one characteristic related to a utility being monitored by the utility monitoring system;
   an interactive display unit communicatively coupled to the utility monitoring device, the interactive display unit including a microphone, a speaker, a video display, and a plurality of input devices, each coupled to a controller;
   a communications interface programmed to communicate data over a communications medium according to a communications protocol between a remote system and the utility monitoring device or the interactive display unit; and an Internet protocol (IP) controller for converting between audio data received by the microphone to voice data representative of the audio data, the IP controller being coupled to the controller, the IP controller being programmed to communicate the voice data via the communications interface over the communications medium according to the communications protocol.

17. The utility monitoring system of claim 16, wherein the interactive display unit includes an imaging device coupled to the controller, the IP controller being programmed to convert image data received from the imaging device to video data representing the image data, the IP controller being further programmed to communicate the video data relative to the communications interface over the communications medium.

18. The utility monitoring system of claim 16, wherein the interactive display unit includes the communications interface.

19. The utility monitoring system of claim 16, wherein the interactive display unit includes the IP controller.

20. The utility monitoring system of claim 16, wherein the controller is programmed to initiate a voice-enabled communication link over the communications medium between the utility monitoring device and the remote system or a second utility monitoring device in response to the actuation of at least one of the plurality of input devices, the controller being further programmed to communicate characteristic data representing the at least one characteristic between the utility monitoring device and the remote system or the second utility monitoring device.

21. The utility monitoring system of claim 16, wherein the utility monitoring device includes a memory storing configuration data indicative of configuration parameters of the utility monitoring device, the controller being programmed to communicate at least a portion of the configuration data between the utility monitoring device and the remote system or a second utility monitoring device.

22. The utility monitoring system of claim 16, wherein the utility monitoring device includes a memory storing firmware, the controller being programmed to receive an instruction from the remote system over the communications medium, the instruction causing the remote system to download to the utility monitoring device a second firmware that the controller replaces with the firmware stored in the memory.

23. The utility monitoring system of claim 16, wherein the utility monitoring device includes the interactive display unit.

24. The utility monitoring system of claim 16, wherein the interactive display unit is wirelessly coupled to the utility monitoring device.

* * * * *